US007740000B2

(12) United States Patent
He et al.

(10) Patent No.: US 7,740,000 B2
(45) Date of Patent: Jun. 22, 2010

(54) METHOD AND APPARATUS FOR INJECTING FUEL INTO A COMPRESSION-IGNITION ENGINE

(75) Inventors: Xin He, Grosse Pointe, MI (US); Russell P. Durrett, Bloomfield Hills, MI (US); Gerald P Malta, Shelby Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 275 days.

(21) Appl. No.: 11/956,748

(22) Filed: Dec. 14, 2007

(65) Prior Publication Data

US 2009/0151692 A1 Jun. 18, 2009

(51) Int. Cl.
*F02B 3/00* (2006.01)
*F02B 3/10* (2006.01)

(52) U.S. Cl. .................................................... 123/299

(58) Field of Classification Search ................. 123/299, 123/300, 435, 494, 1 A, 295, 430, 472, 478; 701/103; 73/35.02
See application file for complete search history.

(56) References Cited

U.S. PATENT DOCUMENTS

| 3,792,692 | A | 2/1974 | Kiley |
| 5,265,562 | A | 11/1993 | Kruse |
| 6,691,671 | B2 | 2/2004 | Duffy et al. |
| 2004/0144069 | A1* | 7/2004 | Gabe et al. ............ 55/282.3 |
| 2005/0022514 | A1* | 2/2005 | Kitahara .................. 60/285 |
| 2005/0268883 | A1 | 12/2005 | Sobotowski et al. |
| 2005/0274352 | A1* | 12/2005 | Canale et al. ........... 123/299 |

FOREIGN PATENT DOCUMENTS

| JP | 2002322928 A | 11/2002 |
| JP | 2003532828 A | 11/2003 |
| JP | 2005163548 A | 6/2005 |
| JP | 2007255211 A | 10/2007 |
| KR | 102006010666 | 10/2006 |

OTHER PUBLICATIONS

Tow,T.C.;Reducing Particulate and NOx Emissions by using Multiple Injections in a Heavy Duty DI Diesel Engine; SAE Tech Paper; 1994,#940897; SAE, Warrendale, PA, US.
Nakada,T.; Emission Control for the Duramax 6600 V8 Diesel Engine; SAE Tech Paper, 2000, #2000-01-3513, SAE, Warrendale, PA, US.
Ohishi,K.;The New Common Rail Fuel System for the Duramax 6600 V8 Diesel Engine; SAE Tech Paper, 2001, #2001-01-2704, SAE, Warrendale, PA, US.
Kerekes,J.; The Design Concept of the Duramax 6600 V8 Diesel Engine; SAE Tech Paper, 2001, #2001-01-2703, SAE, Warrendale, PA, US.

* cited by examiner

*Primary Examiner*—Mahmoud Gimie

(57) ABSTRACT

A method to manage and control engine operation includes injecting an initial mass of fuel into a combustion chamber to form a combustion charge, monitoring combustion and injecting a main mass of fuel into the combustion chamber substantially coincident with a start of combustion of the combustion charge.

20 Claims, 4 Drawing Sheets

METHOD AND APPARATUS FOR INJECTING FUEL INTO A COMPRESSION-IGNITION ENGINE

TECHNICAL FIELD

This disclosure pertains to operation and control of compression ignition internal combustion engines.

BACKGROUND

The statements in this section merely provide background information related to the present disclosure and may not constitute prior art.

Manufacturers of compression-ignition engines face increasingly stringent emissions standards, including reductions in allowable levels of nitrides of oxygen ('NOx') and particulate matter ('PM'). Known strategies to reduce emissions include reducing engine-out emissions, and converting engine-out emissions using some form of exhaust gas aftertreatment. Known systems and methods to reduce engine-out emissions include premixing fuel and air in the combustion chamber prior to ignition. Known systems and methods to convert engine-out emissions use some form of exhaust gas aftertreatment device(s), including, e.g., catalytic converters, adsorbers, and afterburners.

Engines using known fuel/air pre-mix charge systems can achieve low NOx and PM emissions at lower engine load operation. However, such operation is limited at higher engine load operation due to excessive combustion noise and combustion stability. Known strategies for fuel/air pre-mix charge systems to expand engine load operation include using multiple fuel injection events during a combustion cycle.

SUMMARY

A reciprocating-piston, direct-injection, compression-ignition internal combustion engine includes a variable-volume combustion chamber defined by the piston reciprocating in a cylinder. An initial mass of fuel is injected into the combustion chamber to form a combustion charge. Combustion is monitored and a main mass of fuel is injected into the combustion chamber substantially coincident with a start of combustion of the combustion charge.

BRIEF DESCRIPTION OF THE DRAWINGS

One or more embodiments will now be described, by way of example, with reference to the accompanying drawings, in which.

DETAILED DESCRIPTION

Figure 1:
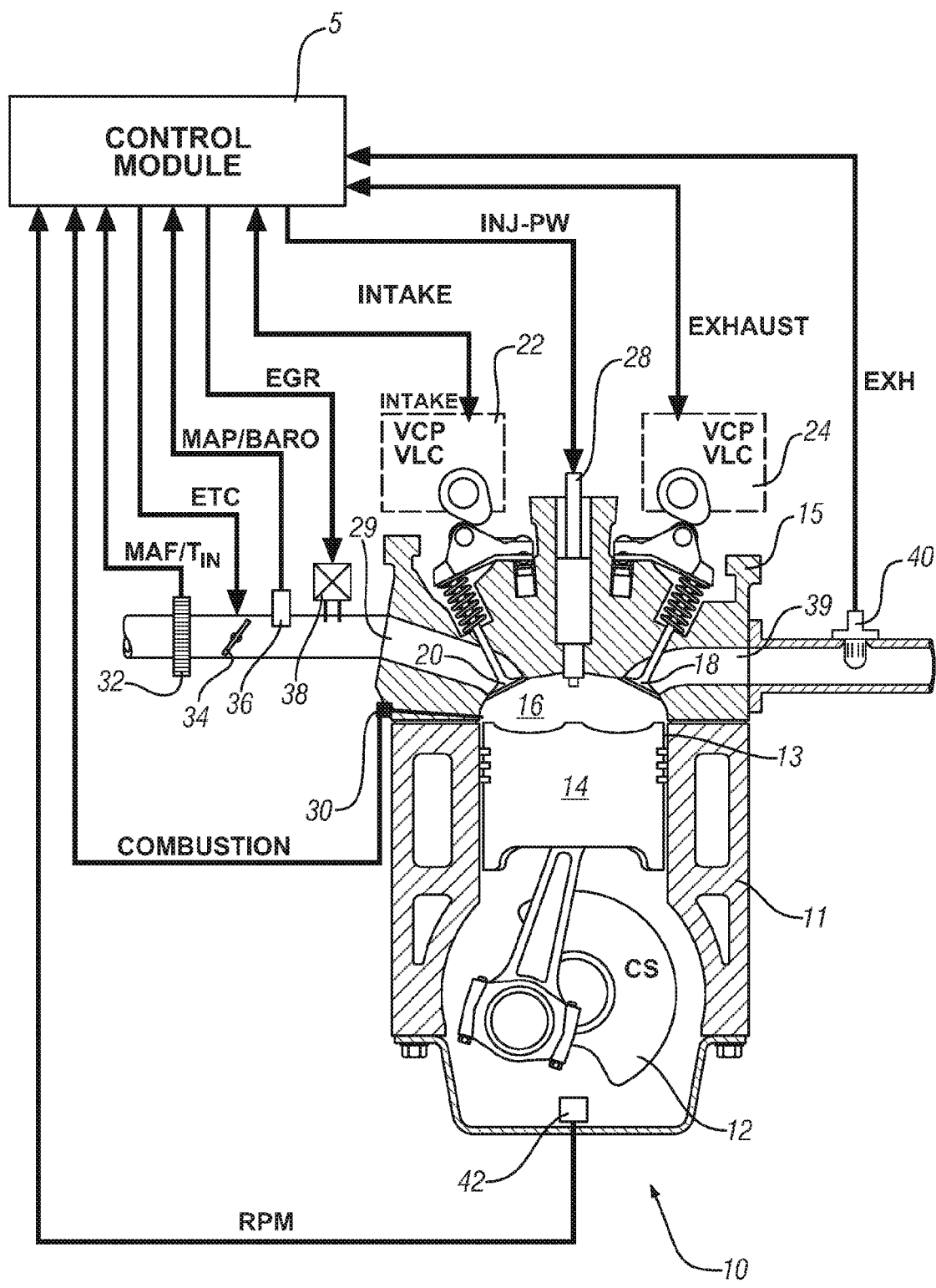
FIG. 1 is a schematic diagram, in accordance with the present disclosure.

Referring now to the drawings, wherein the showings are for the purpose of illustrating certain exemplary embodiments only and not for the purpose of limiting the same, FIG. 1 schematically illustrates a compression-ignition internal combustion engine 10 and control module 5. The exemplary internal combustion engine 10 comprises a multi-cylinder device including an engine block 11, a crankshaft ('CS') 12, and a cylinder head 15. A plurality of cylinders 13 is formed in the engine block 11, each cylinder 13 containing a piston 14 slidably movable therewithin. Each piston 14 mechanically operatively connects to the crankshaft 12 via a piston rod, and the crankshaft 12 mounts to the engine block 11 on main bearings and rotates therein. Reciprocating linear motion of the pistons 14 translates to rotational motion of the crankshaft 12. An air intake system channels intake air to an intake manifold which directs and distributes the intake air into a plurality of intake runners 29. The air intake system comprises airflow ductwork and devices for monitoring and controlling flow of the intake air. The devices preferably include a mass airflow sensor 32 for monitoring mass flow of the intake air and intake air temperature and providing respective output signals ('MAF') and ('Tin') corresponding thereto. A throttle valve 34, preferably an electronically controlled device, controls the flow of the intake air to the engine 10 in response to a control signal ('ETC'). A pressure sensor 36 in the manifold monitors manifold absolute pressure and barometric pressure, and provides respective output signals ('MAP') and ('BARO') corresponding thereto. An external flow passage (not shown) connects engine exhaust to the air intake system for recirculating exhaust gases, and includes a flow control valve, referred to as an exhaust gas recirculation, or EGR valve 38, controlled in response to a control signal ('EGR'). The engine 10 can include other systems, including a turbocharger or supercharger (not shown) to deliver intake air to the engine 10.

Each cylinder 13, reciprocating piston 14 and cylinder head 15 defines a variable volume combustion chamber 16. The crankshaft 12 rotates at the main bearings, in response to linear force applied thereto by the piston rods, as a result of combustion events in the combustion chambers 16. The head 15 contains one or more air inlet ports controlled by one or more intake valve(s) 20, one or more exhaust ports controlled by one or more exhaust valve(s) 18, and a fuel injector 28 operative to inject fuel directly into the combustion chamber 16. Opening and closing of the intake valve(s) 20 is controlled by operation of an intake valve system 22, which controls inflow of intake air to the combustion chamber 16. Opening and closing of the exhaust valves 18 is controlled by operation of an exhaust valve system 24 which controls exhaust of combustion products out of the combustion chamber 16. A crank sensor 42 is located substantially near the crankshaft 12, operative to generate an electrical signal correlatable to angular position of the crankshaft 12. The crank sensor 42 is located substantially near the crankshaft 12 and generates an electrical signal correlatable to a rotational angular position of the crankshaft 12. The signal output ('RPM') of the crank sensor 42 is translated by the control module 5 to determine crankshaft speed and crankshaft rotational position. An exhaust gas sensor 40 monitors exhaust gases and provides an output signal ('EXH'). Exhaust gas sensor 40 preferably comprises a wide range air/fuel ratio sensor.

The engine 10 includes a fuel injection system, comprising a plurality of high-pressure fuel injectors 28 each adapted to directly inject a mass of fuel into one of the combustion chambers 16. The fuel injectors 28 are supplied pressurized fuel from a fuel distribution system (not shown). The fuel distribution system preferably comprises a common rail fuel injection system including a high pressure (e.g., 1,800 bar/ 180 MPa) fuel pump to deliver pressurized fuel to the fuel injector 28. The fuel injector 28 comprises one of a solenoid-actuated or piezoelectric-actuated device having a nozzle placed through an opening in the cylinder head 15 to inject pressurized fuel into the combustion chamber 16. The injector nozzle comprises a fuel injector tip characterized by a number of openings, a spray angle, and a flow number, representing a volumetric flow rate at a given pressure. An exemplary fuel injector nozzle comprises a 7-hole device having a 155-degree spray angle and a 370 flow number (in cc/30-s @100 bar). Fuel injector operating characteristics further comprise a minimum controllable flowrate, a maximum flowrate, and a dynamic range, each dependent upon fuel pressure and other parameters.

The intake valve system 22 controls air flow from the intake runner 29 into each of the combustion chambers 16, including controlling opening and closing of the intake valve(s) 20. The exhaust valve system 24 controls flow of combusted gases from each of the combustion chambers to an exhaust manifold via exhaust runners 39, including controlling opening and closing of the exhaust valve(s) 18. The openings and closings of the intake valve(s) 20 and the exhaust valve(s) 18 are preferably controlled with a dual camshaft system (as depicted), the rotations of which are linked and indexed with rotation of the crankshaft 12. The intake valve system 22 and the exhaust valve system 24 can include devices for controlling phasing (i.e., relative timing) of opening and closing of the intake valve(s) and the exhaust valve(s), referred to as variable cam phasing ('VCP') systems. Variable cam phasing systems operate to shift valve opening time relative to rotational position of the crankshaft 12 and one of the pistons 14, referred to as phasing. The intake valve system 22 and the exhaust valve system 24 can include devices for controlling magnitude of valve lift of the intake valve(s) 20 and the exhaust valve(s) 18, respectively, referred to as variable lift control ('VLC').

A combustion sensor 30 monitors in-cylinder combustion, having a signal output ('COMBUSTION') which is monitored by the control module 5. The combustion sensor 30 preferably comprises a sensor device operative to monitor a combustion state and provide a signal output corresponding to a combustion parameter by which the control module 5 can determine a state of the combustion parameter. The combustion sensor 30 is depicted as a pressure sensor adapted to monitor in-cylinder pressure in real-time, including during combustion. Alternatively, the combustion sensor 30 can comprise sensing devices and accompanying analytical devices (not shown) operative to monitor in-cylinder ion density, e.g., through a glow plug, a combustion chemiluminescence sensor, and a sensor adapted to monitor an intermediate species or a radical concentration, such as OH and HCO species. The preferred combustion sensor 30 monitors a combustion parameter comprising in-cylinder combustion pressure. The control module 5 discerns a start of combustion (hereafter 'SOC') and a corresponding position of the piston 14 via input from the crank sensor 42 during ongoing operation of the engine 10. The SOC is defined herein as a crank angle at which ten percent of a total heat release occurs during a combustion cycle, typically occurring during the compression stroke.

The control module 5 monitors input signals from an operator (e.g., through throttle pedal position sensing and brake pedal position sensing) to determine an operator torque request and monitors input signals from the sensors indicating the engine speed, the engine combustion, the mass air flow, the intake air temperature, the manifold pressure, barometric pressure, coolant temperature, and other ambient conditions. The control module 5 executes algorithmic code stored therein to control the aforementioned actuators to control engine operation. This includes determining, preferably from lookup tables in a memory device in the control module 5, instantaneous control settings for EGR valve position, intake and exhaust valve timing and/or lift set points, and fuel injection timing, and calculates burned gas fractions in the intake and exhaust systems. The control module 5 executes control schemes based upon operator inputs, ambient conditions, and engine operating conditions, and controls actuators thereby. The control module 5 individually and selectively controls each fuel injector 28 to inject precise quantities of fuel at specific times during ongoing operation. This includes controlling fuel injection timing and quantity via a control signal ('INJ_PW') to the injector 28, which preferably comprises a precalibrated injector pulsewidth which corresponds to a mass of fuel injected into the combustion chamber 16 that is determined based upon engine operation and fuel pressure. The control module 5 controls the throttle valve 34 to control the mass flow of intake air into the engine via control signal ETC. The control module 5 controls mass flow of exhaust gas into the air intake system by controlling opening of the exhaust gas recirculation valve 38 via control signal EGR. On systems so equipped, the control module 5 controls operation of the intake valve system 22 via a control signal ('INTAKE') and controls operation of the exhaust valve system 24 via a control signal ('EXHAUST').

The control module 5 preferably comprises a general-purpose digital computer including a microprocessor or central processing unit, storage mediums comprising non-volatile memory devices including read only memory (ROM) and electrically programmable read only memory (EPROM), random access memory (RAM) storage media, a high speed clock, analog-to-digital (A/D) and digital-to-analog (D/A) circuitry, and input/output circuitry and devices (I/O) and appropriate signal conditioning and buffer circuitry. The control module 5 has a set of control algorithms, comprising resident program instructions and calibrations stored in the non-volatile memory and executed to provide the respective functions of each computer. The algorithms are executed during preset loop cycles such that each algorithm is executed at least once each loop cycle. Algorithms are executed by the central processing unit to monitor inputs from the aforementioned sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the engine 10 and vehicle. Alternatively, algorithms may be executed in response to occurrence of an event.

The description of the control module 5 and the internal combustion engine 10 is meant to be illustrative, and not restrictive to the disclosure.

In operation, the control module 5 controls each fuel injector 28 to inject an initial mass of fuel into the combustion chamber 16 to form a combustion charge early in the compression stroke of the combustion cycle. This operation preferably occurs under low to medium load operation, i.e., an engine load of less than about 11 bar BMEP in the present embodiment. An upper limit for operation of the system based upon the engine load can be determined based upon noise, smoke, and other factors for a particular engine design. The combustion chamber 16 is monitored, using the combustion sensor 30, to detect and identify ignition and SOC of the combustion charge. A main mass of fuel is injected into the combustion chamber 16 substantially coincident with the SOC of the combustion charge therein. Timing of the injection of the initial mass of fuel in the combustion chamber 16 is controlled such that the SOC occurs before top-dead-center (hereafter 'bTDC') of piston travel in the cylinder 13. Preferably, timing the injecting of the initial mass of fuel in the combustion chamber 16 occurs such that the SOC occurs at about 10 degrees bTDC of the piston travel.

Figure 2A:
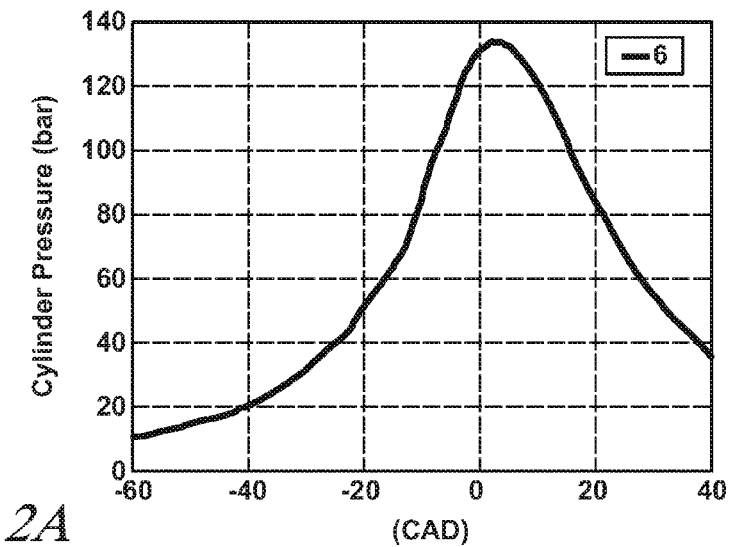
FIGS. 2A-2C are graphical depictions, in accordance with the present disclosure.
Figure 2B:
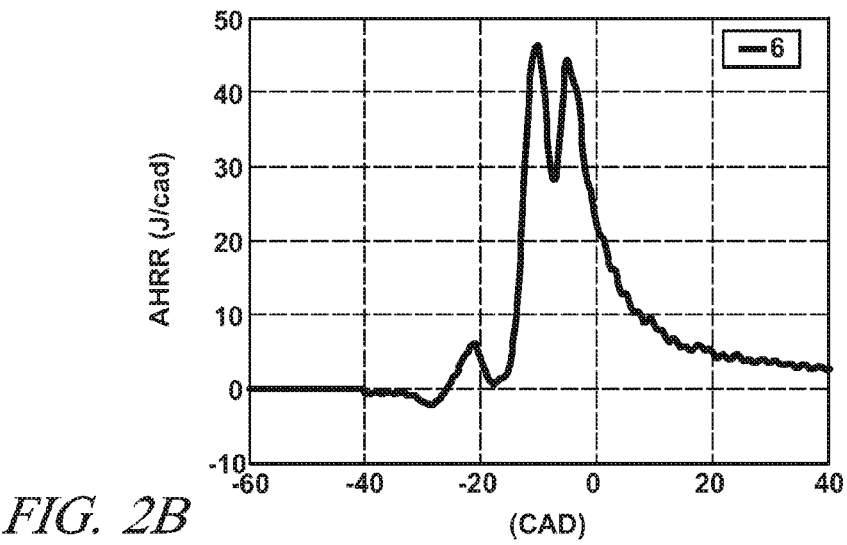
Figure 2C:
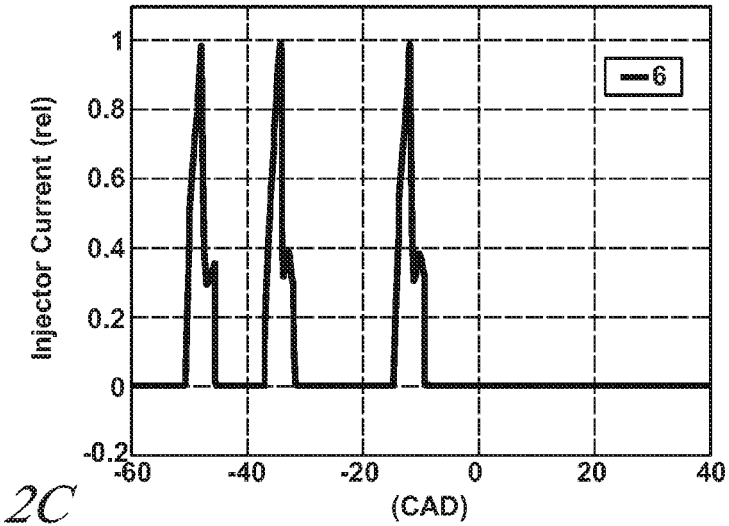

FIG. 2C depicts a fuel injection timing chart detailing operation of the exemplary engine 10 under a specific set of engine operating conditions, operating as described hereinabove. The x-axis depicts piston position, in crank angle degrees ('CAD'), during a compression stroke and an ensuing power stroke. Specific details of the exemplary engine and engine operating conditions are detailed in Table 1 for the results depicted with reference to FIGS. 2, 3 and 4.

TABLE 1

| Parameter | Metric | Units |
| --- | --- | --- |
| Bore | 92 | mm |
| Stroke | 88 | mm |
| Engine Speed | 2060 | Rev/min |
| BMEP | 7.2 | Bar |
| Intake Manifold Temperature | 90 | ° C. |
| Manifold Pressure | 220 | kPa absolute |
| Exhaust Pressure | 280 | kPa absolute |
| Fuel Rail Pressure | 1300 | Bar |
| Injector Tip # of holes | 7 | # |
| Injector Tip Flow Number | 370 | cc/30 s @100 bar |
| Injector Cone Angle | 155 | ° (angle) |

A total mass of fuel for injecting into each cylinder 13 is determined based upon engine operating conditions, ambient conditions, and an operator torque request. The total mass of fuel is split into an initial mass of fuel which is injected early in the compression stroke, and a main mass of fuel which is injected at the end of the compression stroke. As depicted, the initial mass of fuel is split into first and second fuel injection events, with the first injection event occurring at about 50 degrees bTDC. The second injection event is initiated at about 700 microseconds after an end of the first injection event. Timing of the first and second fuel injection events is advanced at higher engine speeds and retarded at lower engine speeds, with the overall intent to control engine operation to effect SOC at about 10 degrees bTDC, as detected by the combustion sensor 30. The main mass of fuel is injected substantially coincident with the SOC, at the end of the compression stroke. A person having ordinary skill in the art understands that there can be variation in detection of SOC due to signal/noise errors, measurement accuracy, and precision of the crank sensor 42 and the combustion sensor 30, which can introduce errors as much as +/−3 crank angle degrees between actual SOC, detection of the SOC, and control of the injector 28 to inject the main mass of fuel. Results depicted with reference to FIG. 4 indicate that such variation in detection has minimal effect upon the operation of the system as described herein.

In FIG. 2C, under the conditions described, the main mass of fuel is injected beginning at about 15 degrees bTDC, and ending at about 9 degrees bTDC. FIG. 2B depicts a heat release rate ('AHRR'), in J/cad, with an increase in heat release beginning at the about 15 degrees bTDC, for the exemplary engine operating under the conditions described. FIG. 2A depicts a corresponding measure of cylinder pressure. Injection of the main mass of relatively cooler fuel into the combustion chamber 16 locally cools the combustion charge, slows chemical reactions of combustion and results in a slower heat release and decreased combustion noise. Fuel vaporization is an endothermic process, thus decreasing any rise in combustion pressure, also decreasing combustion noise.

Figure 3A:
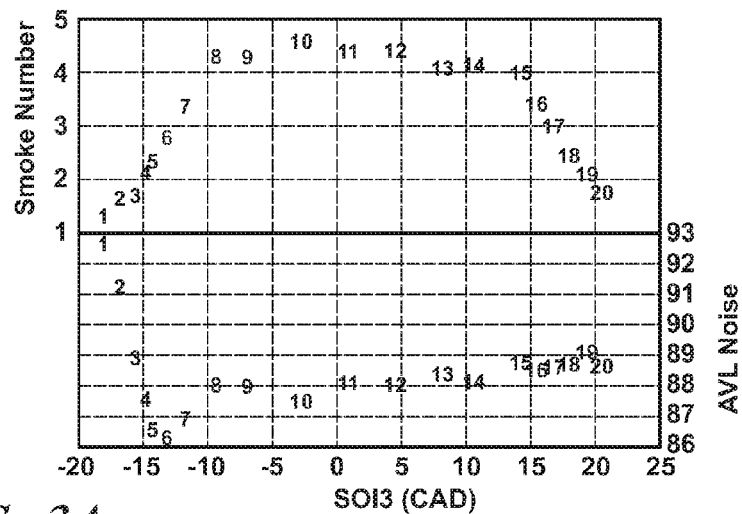
FIGS. 3A-3C and 4 are graphical depictions of quantitative parametric data, in accordance with the present disclosure.
Figure 3B:
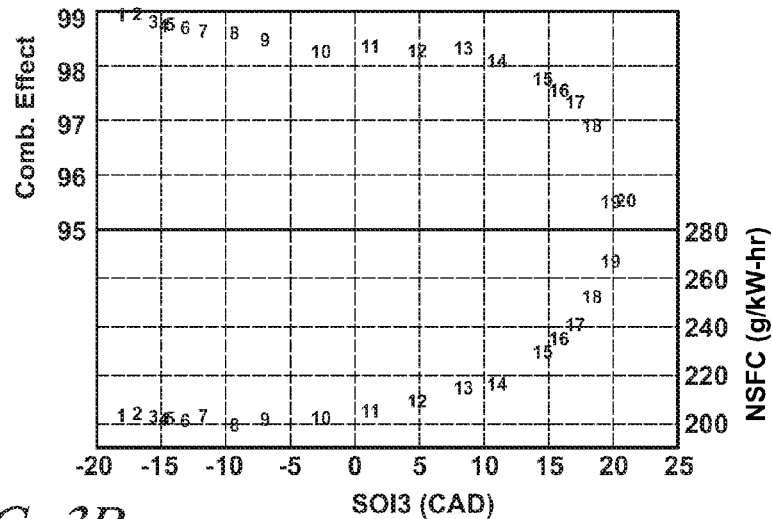
Figure 3C:
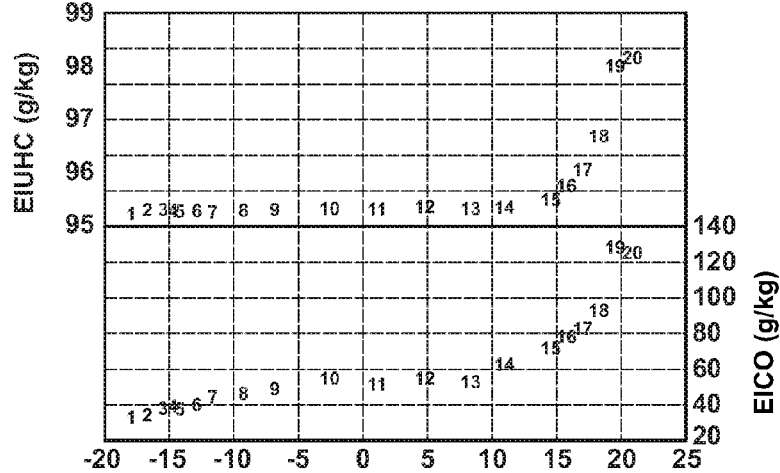

FIGS. 3A-3C depict data derived from operating the exemplary engine 10 under conditions described with reference to Table 1, wherein timing of start of injection of the main mass of fuel ('SOI3') is varied over a range of engine crank angles. Numerals 1-20 used in each of the graphs 3A, 3B, and 3C indicate each specific test number, located to depict a result thereof. Results in FIG. 3A depict a smoke number ('Smoke Number') indicative of particulate matter emissions, and an engine noise number ('AVL Noise'). Results in FIG. 3B depict combustion efficiency ('Comb. Effect'), and a net specific fuel consumption ('NSFC') in g/kW-hr. Results in FIG. 3C depict engine-out hydrocarbons ('EIUHC') in g/kg, and engine-out carbon monoxide ('EICO') in g/kg. The results indicate optimal operation for smoke and noise that is substantially coincident with the SOC.

Figure 4:
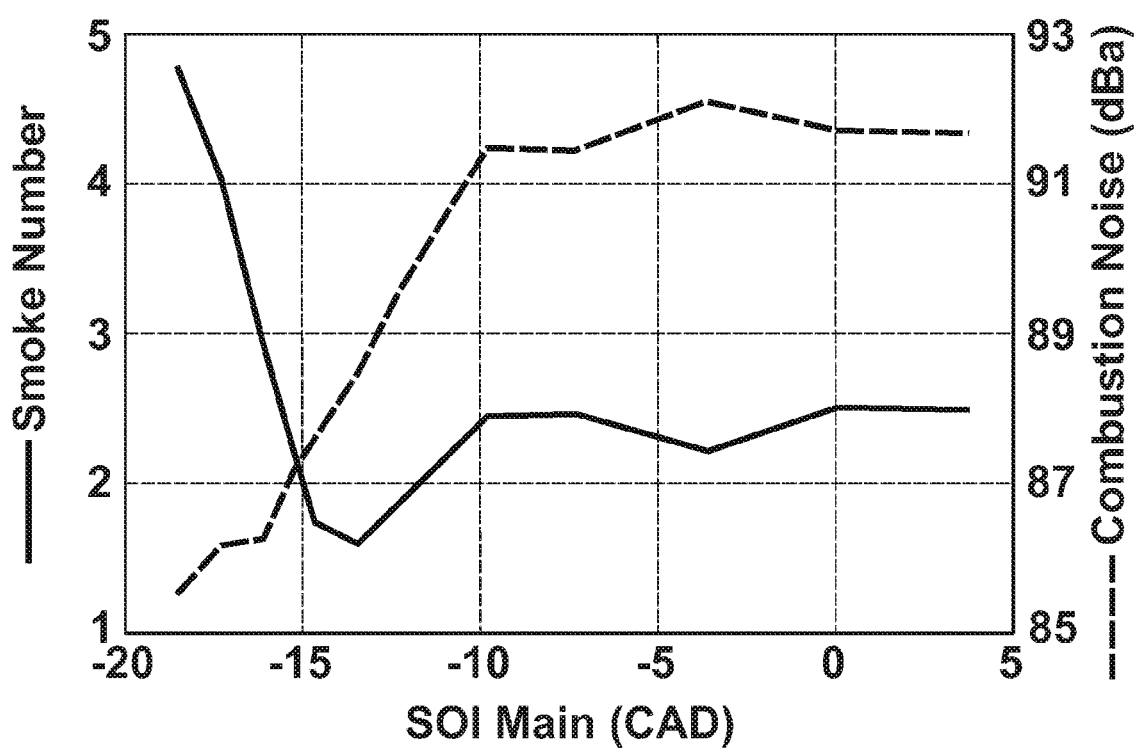

FIG. 4 depicts data derived from operating the exemplary engine 10 under conditions described with reference to Table 1, wherein timing of start of injection of the main mass of fuel is varied over a range of engine crank angles. A smoke number and combustion noise are plotted against timing of start of injection of the main injection event ('SOI Main') in crank angle degrees ('CAD'). The data indicates that there is an optimum start of injection of the main injection event for noise and smoke, and movement of the start of injection causes an increase in one of either the smoke or the noise. There can be injection pulses occurring after the main injection, referred to as post injection, in the form of single or multiple injection pulses.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for controlling combustion in a reciprocating-piston, direct-injection, compression-ignition internal combustion engine including a variable-volume combustion chamber defined by the piston reciprocating in a cylinder, comprising:
    injecting an initial mass of fuel into the combustion chamber early in the compression stroke to form a combustion charge;
    monitoring combustion to determine a start of combustion of the combustion charge; and
    injecting a main mass of fuel into the combustion chamber at the end of the compression stroke and substantially coincident with the start of combustion of the combustion charge.

2. The method of claim 1, comprising controlling timing of the injecting of the initial mass of fuel into the combustion chamber to start combustion of the combustion charge before top-dead-center of piston travel in the combustion chamber.

3. The method of claim 2, further comprising controlling timing the injecting of the initial mass of fuel into the combustion chamber such that the start of combustion of the combustion charge occurs at about ten degrees before top-dead-center of piston travel in the combustion chamber.

4. The method of claim 1, wherein injecting the initial mass of fuel into the combustion chamber comprises executing a first injection event and a second injection event.

5. The method of claim 1, wherein monitoring combustion comprises monitoring an engine state from which a state of a combustion parameter can be determined.

6. The method of claim 5, further comprising monitoring combustion chamber pressure.

7. The method of claim 1, wherein the start of combustion is determined based upon a heat release of the combustion charge.

8. The method of claim 1, comprising injecting the initial mass of fuel in the combustion chamber to form the combustion charge at an engine operating point comprising low to medium load operation.

9. A method for controlling combustion in a reciprocating-piston, direct-injection, compression-ignition internal combustion engine including a variable-volume combustion chamber defined by the piston reciprocating in a cylinder, comprising:
injecting an initial mass of fuel into the combustion chamber to form a combustion charge during a compression stroke of the piston during low to medium engine load operation;
monitoring combustion to determine a start of combustion of the combustion charge; and
injecting a main mass of fuel into the combustion chamber at the end of the compression stroke and substantially coincident with a the start of combustion of the combustion charge based upon the monitored combustion.

10. The method of claim 9, comprising controlling the injecting of the initial mass of fuel into the combustion chamber to start combustion of the combustion charge before top-dead-center of piston travel during the compression stroke.

11. The method of claim 10, further comprising controlling the injecting of the initial mass of fuel into the combustion chamber such that the start of combustion of the combustion charge occurs at about ten degrees before top-dead-center of piston travel during the compression stroke.

12. The method of claim 11, further comprising injecting the initial mass of fuel in the combustion chamber by executing a first injection event and a second injection event.

13. The method of claim 9, wherein monitoring combustion comprises monitoring an engine state from which a state of a combustion parameter can be determined.

14. The method of claim 13, wherein monitoring the engine state comprises monitoring in-cylinder combustion chamber pressure.

15. The method of claim 13, further comprising determining the start of combustion based upon a state of a combustion parameter corresponding to heat release of the combustion charge.

16. An internal combustion engine system, comprising:
a reciprocating-piston, direct-injection, compression-ignition internal combustion engine including a variable-volume combustion chamber defined by the piston reciprocating in a cylinder;
a device monitoring an engine state correlatable to combustion within the combustion chamber; and
a control system for monitoring output from the device, controlling injection of an initial mass of fuel injection into the combustion chamber early in the compression stroke to establish a combustion charge, monitoring combustion to determine a start of combustion of the combustion charge, and controlling injection of a main mass of fuel into the combustion chamber at the end of the compression stroke and substantially coincident with the start of combustion of the combustion charge.

17. The internal combustion engine of claim 16, comprising the control system controlling timing of injection of the initial mass of fuel in the combustion chamber to start combustion of the combustion charge before top-dead-center of piston travel during a compression stroke.

18. The internal combustion engine of claim 17, comprising the control system controlling timing of injection of the initial mass of fuel into the combustion chamber such that the start of combustion of the combustion charge occurs at about ten degrees before top-dead-center of piston travel during the compression stroke.

19. The internal combustion engine of claim 18, comprising the control system controlling timing of injection if the initial mass of fuel and the main mass of fuel into the combustion chamber during low to medium engine load operation.

20. The internal combustion engine of claim 19, wherein the start of combustion is determined based upon a heat release of the combustion charge.

* * * * *